No. 724,065. PATENTED MAR. 31, 1903.
C. WEICHOLD.
NUT LOCK.
APPLICATION FILED JUNE 30, 1902.
NO MODEL.
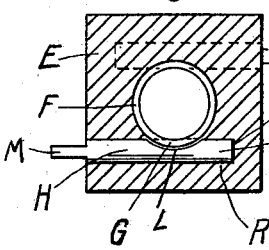
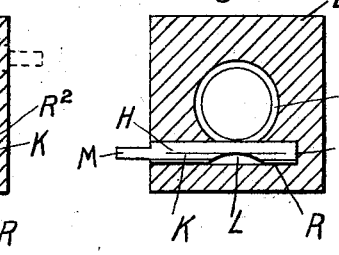
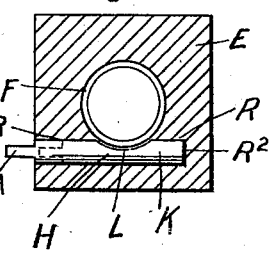
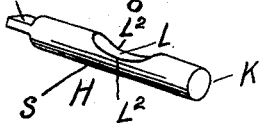
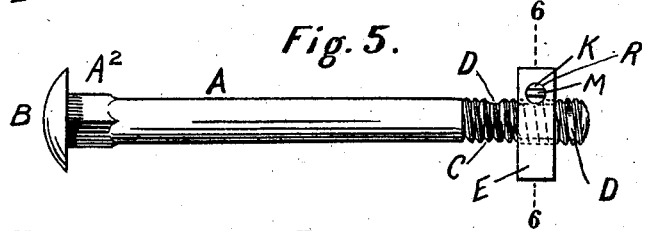
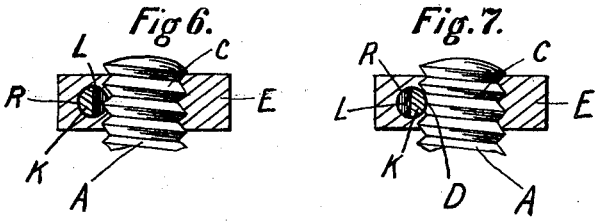
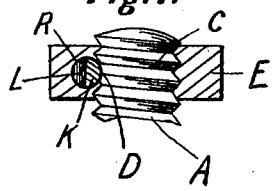
WITNESSES:
Charles H. Spiegel.
R. Smith.
INVENTOR.
Charles Weichold
BY Wm. Hubbell Fisher,
ATTORNEY.

UNITED STATES PATENT OFFICE.

CHARLES WEICHOLD, OF CINCINNATI, OHIO.

NUT-LOCK.

SPECIFICATION forming part of Letters Patent No. 724,065, dated March 31, 1903.

Application filed June 30, 1902. Serial No. 113,833. (No model.)

*To all whom it may concern:*

Be it known that I, CHARLES WEICHOLD, a citizen of the United States, and a resident of the city of Cincinnati, in the county of Hamilton and State of Ohio, have invented certain new and useful Improvements in Nut-Locks, of which the following is a specification.

The purpose of my invention is to produce a nut-lock which can be made at a slight financial cost, shall be compact in form, efficient as a lock, and be easily operated.

Other advantages will be apparent from an inspection of the specification.

The several features of my invention and the various advantages resulting from their use conjointly or otherwise will be apparent from the following description and claims.

In the accompanying drawings, making a part of this specification, similar letters of reference indicate corresponding parts.

Figure 1 is a side view of a nut and of the key in position ready to be turned and to lock the bolt. Fig. 2 is a side view of the nut, showing by dotted lines how the thread of the nut is cut away to allow the key when in place, as shown in Fig. 1, to be rotated to lock the bolt in place. The key is in position to receive the bolt and to be locked. The dotted line across the lower part of the nut-thread indicates how the opening for the reception of the key is there continued across the nut. The dotted lines at the upper part of the nut indicate how a second key could be present. Fig. 3 is a side view of the nut, showing the key in the position it assumes when it has been turned so as to lock the bolt fast in the nut. Fig. 4 shows the locking-key in perspective. Fig. 5 is an elevation of the nut and bolt and showing the result upon the screw-thread of the bolt produced by the action of the locking-key when rotated to lock the bolt fast in the nut. Figs. 6 and 7 show a section of the nut and locking-key taken in the plane of the dotted line 6 6 of Fig. 5 and showing the bolt in elevation. Fig. 6 shows the key in a position where it leaves the bolt free to be turned. Fig. 7 shows the key in a position where it prevents the bolt from being turned.

A indicates the bolt, and E the nut. Both of these may vary in size. The screw-thread C of the bolt has the same pitch and coarseness as the interior screw-thread F within the nut. This pitch of these screw-threads and their fineness or coarseness may be varied to suit the functions which the bolt and nut are designed to perform. The head B of the bolt may be varied in shape. In many cases, especially where the bolt has a head adapted to be held by an external agency from turning while the nut is screwed on it to place, these parts $A^2$ may be omitted. The shape of the nut may be varied and assume any desired shape consistent with the performance of its functions.

The locking-key H is primarily a shank K, preferably round and having in one side a depression L. When the key is viewed from its side—that is, it is seen in side elevation, as in Figs. 1 to 3, inclusive—this depression L has the shape of a sector of a circle, and this circle has substantially the same diameter as that described by the surface of the nut between the threads of its screw F and the same diameter as that described by the periphery of the threads of the screw C of the bolt.

One end of the shank K is so constructed as to enable it to be forcibly rotated. A convenient formation of the end for this purpose consists in reducing the round shank, so as to leave a handle flat on the sides, substantially as shown at M in the figures of the drawings.

In the nut I form a hole or recess R of a proper size to receive the key H. The key H when inserted in the hole R fits the latter so closely that it will not rotate unless forced to do so by human agency applied to the handle of the key. This hole R crosses a portion of the thread of the nut, substantially as shown. This hole R is preferably a recess—that is, the hole is not continued through the nut. The inner end $R^2$ obviates the necessity of any other stop to regulate the distance the key shall enter this hole. The hole R is of such a length relatively to the key that when the latter is in the hole and against the end $R^2$ its depression L will aline with the thread F of the nut, as shown in Fig. 1.

The mode in which my invention operates is as follows: The bolt A having been put in place the nut E, with the key H therein, the latter in the position shown by Figs. 1, 2, is screwed to place on the bolt. Now the nut is in readiness to be locked on the bolt. A wrench or pincers or other appropriate tool is applied to the handle M, and thereby the key H is forcibly rotated a half-turn. This rotation compels one or the other of the edges $L^2$ of the steel key to cut into and through the contiguous part of the screw-thread C. Thus such part of the screw-thread C is cut away, and a notch or depression D is thus then formed in the bolt (see Fig. 5) where two such depressions have been thus cut at two different times, once when the nut was near the free end of the bolt and once when the nut was farther toward the head of the bolt than it is in said figure. The depression L of the key now no longer fits or coincides with the thread F of the nut and the thread C of the bolt, but, on the contrary, lies in the hole R away from these threads and has assumed the position shown in Figs. 3 and 7. A part of that surface S of the back of the key which has no such depression, as L, now occupies the notch D of the bolt A. (See Figs. 3 and 7.) Now any effort to rotate the bolt is frustrated, because the threads cannot pass this back of the key, but strike against it as an impediment. Thus the nut is securely locked on the bolt. When it is desired to unlock the nut, the key H is rotated a half-turn, thereby bringing the depression L back to its first-named position—namely, that shown in Figs. 1, 2, and 6. The key is not now in the way of the thread of the bolt as it or the nut is rotated. Hence the nut can readily be removed from the bolt. In case the same bolt is to have the nut locked thereon in the same place the nut is screwed to place, the key is then rotated, and as the notch D has been already cut the key does not cut a new notch, but the back of the key opposite L fills the notch and the nut is locked on the bolt; but if the nut has to occupy a different place on the bolt from that which it heretofore occupied the rotation of the key cuts a new notch D in the manner heretofore specified.

Some of the advantages of my invention are the following: The key is simple in construction and readily made. Its operation is simple. It has long cutting edges $L^2$ $L^2$, and these cut out smoothly a long part of the bolt-thread and form the long notch D. Quite a long portion of the back S of the key fills this notch. It is for this reason that the lock is a very substantial one and is in no wise likely to give way and the nut work loose and come off, as in the case of nut-locks where the hold of the key on the thread of the bolt is little and feeble. When desired, the key present in the nut can be duplicated in another part of the nut. Such a duplication is indicated by the dotted lines in the upper portion of the nut shown in Fig. 2.

The handle of the key or keys may be located altogether within the nut, as suggestively indicated in Fig. 1.

What I claim as new and of my invention, and desire to secure by Letters Patent, is—

1. A nut-lock consisting of the nut having a screw-thread F, and an opening R in the nut interrupting the thread substantially as shown, and a key having a broad depression having long edges, the depression which, when the key is not in use, receives the thread of the bolt without friction, the long edges of the depression adapted when the key is rotated to cut or shave off the thread of the bolt on the side next this edge, the back S of the bolt when turned being adapted to fit into the notch in the thread of the bolt formed by the key when it cuts off such thread, and formed such notch, substantially as and for the purposes specified.

2. A nut-lock consisting of the nut having a screw-thread F and an opening R in the nut interrupting the thread, and tangentially to the circle of the cylindrical space formed by this female screw, and a key having a broad depression, which when the key is not in use, receives the thread of the bolt without friction, the long edges of the depression adapted when the key is rotated to cut or shave the thread of the bolt on the side next this edge, the key provided with means at its back for locking with the nut, so that when the key is rotated, such means shall lock into the depression of the interrupted thread of the bolt, and prevent the latter from rotating, substantially as and for the purposes specified.

3. A nut-lock consisting of the nut having a screw-thread F, and an opening R in the nut, interrupting the thread at a given location, and a key having a concave depression whose outline is part of a circle having substantially the same diameter as the circle described by the peripheral surface of the thread of the nut, the surface of the depression, when the key is not locking the bolt, being close to and encircling the adjacent portion of the bolt-thread, the key having a back S, which when the key is rotated to lock the bolt fits the flat depression resulting from the cutting away of the edge of the thread by the side edge of the depression of the key, and prevents the bolt from rotation, substantially as and for the purposes specified.

CHARLES WEICHOLD.

Attest:
SAMUEL A. WEST,
K. SMITH.